United States Patent
Abdoli et al.

(10) Patent No.: US 10,938,439 B2
(45) Date of Patent: Mar. 2, 2021

(54) TWO-PHASE TRANSMISSION FOR MACHINE-TYPE COMMUNICATION

(71) Applicants: Javad Abdoli, Kanata (CA); Ming Jia, Ottawa (CA)

(72) Inventors: Javad Abdoli, Kanata (CA); Ming Jia, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 177 days.

(21) Appl. No.: 16/162,621

(22) Filed: Oct. 17, 2018

(65) Prior Publication Data

US 2019/0052305 A1  Feb. 14, 2019

Related U.S. Application Data

(62) Division of application No. 15/165,249, filed on May 26, 2016, now Pat. No. 10,128,897.

(51) Int. Cl.
| | |
|---|---|
| H04B 1/69 | (2011.01) |
| H04B 1/707 | (2011.01) |
| H04W 4/70 | (2018.01) |
| H04B 1/04 | (2006.01) |

(52) U.S. Cl.
CPC .............. *H04B 1/69* (2013.01); *H04B 1/04* (2013.01); *H04B 1/707* (2013.01); *H04W 4/70* (2018.02)

(58) Field of Classification Search
CPC ........ H04B 1/707; H04B 7/0413; H04B 1/69; H04J 13/00; H04W 4/70
See application file for complete search history.

(56) References Cited

U.S. PATENT DOCUMENTS

| | | | |
|---|---|---|---|
| 6,259,724 B1 | 7/2001 | Esmailzadeh | |
| 6,442,153 B1 | 8/2002 | Dahlman et al. | |
| 6,535,547 B1* | 3/2003 | Lyckegård | H04J 13/004 |
| | | | 370/322 |
| 2004/0162083 A1 | 8/2004 | Chen et al. | |
| 2005/0020215 A1 | 1/2005 | Hottinen | |
| 2007/0036203 A1 | 2/2007 | Feher | |
| 2013/0070624 A1 | 3/2013 | Nguyen et al. | |
| 2015/0071182 A1* | 3/2015 | Bayesteh | H04L 5/0042 |
| | | | 370/329 |

(Continued)

FOREIGN PATENT DOCUMENTS

| | | |
|---|---|---|
| CN | 1302124 A | 7/2001 |
| CN | 1113576 C | 7/2003 |

(Continued)

OTHER PUBLICATIONS

Y. Han, S. Zhang, W. Zhou and Q. Ling, "Enabling SCMA long codewords with a parallel SCMA coding scheme," 2015 International Conference on Wireless Communications & Signal Processing (WCSP), Nanjing, 2015, pp. 1-6. (Year: 2015).*

(Continued)

*Primary Examiner* — Ross Varndell

(57) ABSTRACT

A two-phase approach to machine-type communications is provided. In a first phase, for activity detection, at least one symbol is transmitted using a long signature. During a second phase, for data transmission, information-carrying symbols are transmitted using a short spreading signature. Activity detection performance is enhanced through the use of a longer spreading signature.

20 Claims, 5 Drawing Sheets

(56) References Cited

U.S. PATENT DOCUMENTS

2016/0057755 A1* 2/2016 Wild ............... H04W 74/0833
370/335
2016/0359583 A1 12/2016 Tarokh et al.
2016/0374116 A1 12/2016 Sexton et al.

FOREIGN PATENT DOCUMENTS

| CN | 1166241 C | 9/2004 |
|---|---|---|
| CN | 1543723 A | 11/2004 |
| CN | 101438612 A | 5/2009 |
| CN | 101917209 A | 12/2010 |
| CN | 102812643 A | 12/2012 |
| CN | 103181111 A | 6/2013 |
| WO | 1999021375 A2 | 4/1999 |
| WO | 9931919 A1 | 6/1999 |
| WO | 2018099387 A1 | 6/2018 |

OTHER PUBLICATIONS

Gabor Hannak et al, Joint channel estimation and activity detection for multiuser communication systems, 2015 IEEE International Conference on Communication Workshop (ICCW), Sep. 14, 2015, 6 pages.

Henning F. Schepker et al, Exploiting Sparsity in Channel and Data Estimation for Sporadic Multi-User Communication, ISWCS 2013; The Tenth International Symposium on Wireless Communication Systems, Oct. 15, 2013, 5 pages.

Xiao Xu et al, Active User Detection and Channel Estimation in Uplink CRAN Systems. IEEE ICC 2015—Wireless Communications Symposium, 6 pages.

* cited by examiner

TWO-PHASE TRANSMISSION FOR MACHINE-TYPE COMMUNICATION

CROSS REFERENCE TO RELATED APPLICATION

This application is a divisional of U.S. patent application Ser. No. 15/165,249 Filed May 26, 2016, which is hereby incorporated by reference.

FIELD

The application relates to grant-free transmission, such as machine-type communications.

BACKGROUND

In some network applications, there may be a large pool of machine-type devices, among which only a few are simultaneously active. Such devices will typically use grant-free uplink transmission, and will employ short-packet transmission with a low modulation and coding scheme (MCS). Compressed sensing (CS) can be used in such applications for device activity detection.

Activity detection is an important feature of any uplink random access system. Activity detection involves detecting which devices are transmitting. CS is a tool for UE (user equipment, for example a machine-type device) detection in scenarios where UE activity is sparse in the sense that from a large number of UEs that could attempt to access the system at a given instant, typically a relatively small number are in fact attempting to access the system. In other words, a small number of UEs among a large pool of UEs are simultaneously active.

Where an active device spreads its data symbols over several chips using a spreading signature of moderate length, the receiver uses the entire received spread signal to detect the fact that the device is transmitting, i.e. detect the fact that the device is active, and also to decode the active device's data.

With CS, an underdetermined set of equations is expressed in terms of an unknown sparse vector. The number of nonzero elements in the unknown vector is much less than the number of observations.

A standard CS problem involves solving an underdetermined set of (noisy or noiseless) equations in terms of an unknown sparse vector based on a number of observations. The number of nonzero elements in the unknown vector is much less than the number of observations. The set of (noisy) equations can be expressed as follows:

$$y_{M \times 1} = P_{M \times N} \cdot h_{N \times 1} + n_{M \times 1}$$

where the elements of the equation are:
$y_{M \times 1}$= is a set of M observations;
$h_{N \times 1}$ is a set of N unknowns;
$P_{M \times N}$ is a matrix that defines linear combinations of the unknowns; and
$n_{M \times 1}$ is a set of noise components,
with K<<M<N, where K is the number of nonzero elements of h.

The CS problem is usually cast as an optimization problem. One typical example is the following convex optimization problem:

$$\hat{h} = \arg\min_h \frac{1}{2} \| y - Ph \|_2^2 + \lambda \| h \|_1$$

where $\|\cdot\|_2$ and $\|\cdot\|_1$ denote $l_2$-norm and $l_1$-norm of a vector, respectively, defined as $$\|x\|_2 = \sqrt{\Sigma_i |x_i|^2} \text{ and } \|x\|_1 = \Sigma_i |x_i|$$

The UE detection problem can be recast as a CS problem based on the following set of equations:

$$y_{M \times 1} = P_{M \times N} \cdot h_{N \times 1} + n_{M \times 1}$$

where the elements of the equation are:
$y_{M \times 1}$= is a set of M observations;
$h_{N \times 1}$ is a set of N unknowns representing the vector of channel coefficients of the UEs; each active UE corresponds to a nonzero element in h and each inactive UE corresponds to a zero element in h. It is noted that h is not the channel per se, but is a CS determined single value that represents a fixed channel over the entire pilot sequence; following CS detection, h is the CS detection output;
$P_{M \times N}$ is a pilot matrix, each column of which represents the pilot vector of a specific UE;
$n_{M \times 1}$ is a set of noise components;
with K<<M<N, where
K is the number of nonzero elements of h, which is equal to the number of UEs that are active at a given instant;
N is the size of the pool of UEs that might be active; and
M is the number of observations.

A corresponding approach is based on block-wise compressed sensing. Blockwise CS is formulated as L underdetermined sets of equations in terms of L unknown sparse vectors with the same sparsity pattern $$Y_{M \times L} = P_{M \times N} \cdot X_{N \times L} + Z_{M \times L}$$

$$\hat{X} = \arg\min_X \frac{1}{2} \| Y - PX \|_2^2 + \lambda \cdot norm(X)$$

where X is a row-sparse matrix and norm(X) is a row-sparsifying norm. As an example, norm(X) can be defined as norm(X) $\Sigma_i \sqrt{\Sigma_j |x_{i,j}|^2}$.

It can be seen that in both cases described above, there are two terms in the convex optimization problem. The second term is a convex function which ensures the vector x (or the matrix X) that minimizes the optimization objective is as sparse (or row-sparse) as possible. λ represents a weighting factor between the two terms in the optimization.

SUMMARY

A broad aspect of the invention provides a method of transmitting data. For activity detection, at least one symbol is transmitted using at least one spreading signature of a first length. For data transmission, a plurality of symbols are transmitted using at least one spreading signature of a second length that is shorter than the first length. Advantageously, using a relatively longer spreading signature for the symbol transmitted for activity detection increases the likelihood that devices will be accurately detected.

Optionally, transmitting at least one symbol using at least one spreading signature of a first length involves transmitting a single symbol multiplied by one spreading signature of the first length. Alternatively, multiple symbols can be sent, each multiplied by a different spreading sequence of the first length.

Optionally, transmitting a plurality of symbols using at least one spreading signature of a second length comprises transmitting the plurality of symbols using a plurality of spreading signatures of the second length. Each spreading sequence may be used for several of the symbols.

Optionally, the spreading signatures are specified by assigning to the transmitter a column-wise cyclic offset of a matrix containing the predefined set of spreading signatures.

Another broad aspect provides a method of detecting active devices, and then receiving their data. The method involves detecting whether a device is active by processing a received signal using at least one spreading signature of a first length. Optionally, compressed sensing is used. If the particular device is detected as active, the method continues with performing data decoding using at least one spreading signature of a second length that is shorter than the first length.

Another broad aspect of the invention provides a two-phase transmitter that has a first spreading signature selector for selecting at least one spreading signature of a first length, a spreader for spreading at least one symbol using the at least one spreading signature of the first length to produce a first spreader output for activity detection, a second spreading signature selector for selecting at least one spreading signature of a second length that is shorter than the first length, the spreader also for spreading a plurality of data symbols using the at least one spreading signature of a second length to produce a second spreader output, and an RF transmit chain for transmitting the first spreader output and the second spreader output.

Another broad aspect of the invention provides a two-phase receiver that has an activity detector configured to detecting whether a device is active by processing a received signal using at least one spreading signature of a first length, and a multi-user data decoder configured to performing data decoding for devices detected to be active by the activity detector using at least one spreading signature of a second length that is shorter than the first length.

BRIEF DESCRIPTION OF THE DRAWINGS

Embodiments of the invention will now be described with reference to the attached drawings in which.

DETAILED DESCRIPTION

Figure 1:
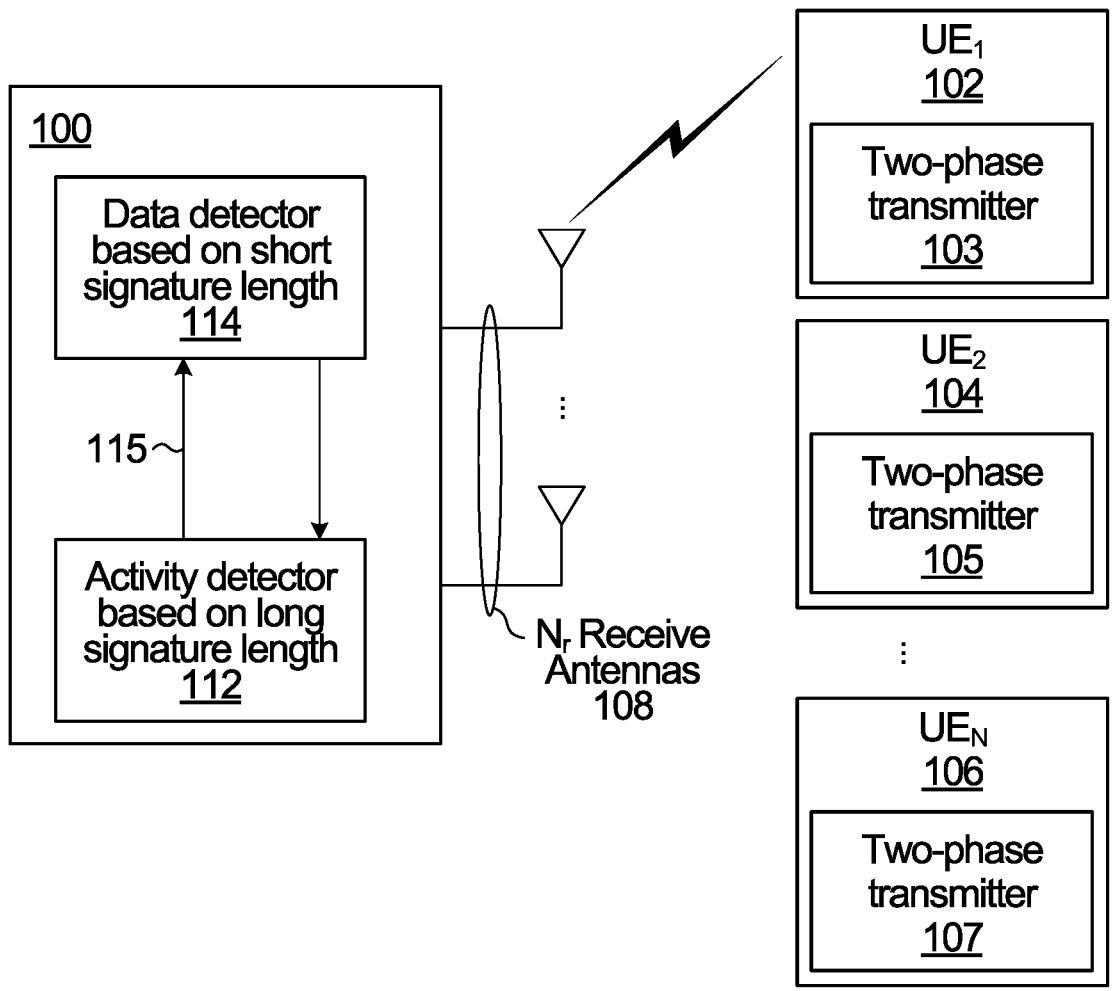
FIG. 1 is a block diagram of a system with two-phase transmission.

Generally, embodiments of the present disclosure provide a method and system for two-phase machine type communication. For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

It has been observed that the performance of CS is improved with increased block length and/or with increased spreading factor length, and that the improvement is more sensitive to an increased spreading factor length than to an increased block length.

Embodiments of the invention relate to two-phase data transmission, for example for grant-free transmission, such as machine-type communication (MTC) transmission, in which symbols transmitted for activity detection are transmitted with a longer signature length, relative to a signature length used for data transmission, so as to improve the activity detection reliability.

A first signature length is employed for symbols transmitted for activity detection, and a second signature length is employed for symbols transmitted for data transmission. The first signature length is longer than the second signature length so as to improve the activity detection reliability. Spreading signatures having the first signature length will be referred to herein as long spreading signatures, and spreading signatures having the second signature length will be referred to herein as short spreading signatures.

Referring now to FIG. 1, shown is a system with two-phase transmission, and UE activity detection and data detection provided by an embodiment of the invention. The system includes a receiver, generally indicated at 100, which may, for example, be a wireless base station. Also shown is a set of UEs $UE_1$ 102, $UE_2$ 104, . . . , $UE_N$ 106. More generally, the receiver 100 of FIG. 1 is configured to perform UE detection of active UEs within a pool of up to N UEs, but there may or may not be N UEs in the vicinity of the receiver 100 at a given instant.

The UEs 102, 104, . . . , 106 have respective two-phase transmitters (TPT) 103,105,107 that perform two-phase transmission. Each UE has one or more antennas. It should be understood that the UEs are shown with components to perform two-phase transmission, but that typically each transmitter will include other functionality and components.

The receiver 100 has $N_r$ receive antennas 108, where $N_r>=1$. The receiver 100 has an activity detector based on long signature length 112, and a data detector based on short signature length 114, that perform UE activity detection and data detection as a function of signals received at the $N_r$ receive antennas 108. It should be understood that the receiver has components to perform two-phase reception, but that typically each transmitter will include other functionality and components.

In operation, one or more of the UEs may be active at a given time. Each active UE transmits a two-phase transmission containing at least one symbol for activity detection and a plurality of symbols for data transmission. This can be done using one of the methods described below, for example.

The receiver 100 does not know which UEs are active. Symbols for activity detection will only actually be transmitted by active UEs. The activity detector 112 performs activity detection, for example using one of the methods described below. An output of the activity detector 112 identifying the active devices is passed to the data detector 114 at 115. The data detector 114 performs data detection for symbols transmitted by UEs detected to be active.

Figure 2:
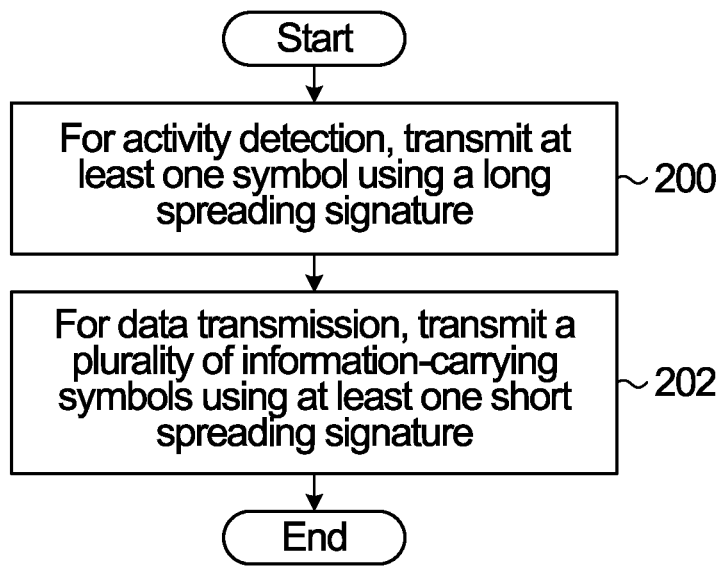
FIG. 2 is a flowchart of a method of transmitting a two-phase transmission.

A method performed by a transmitting device, for example the UEs of FIG. 1, will now be described with reference to FIG. 2. In the case of an MTC device, for example, the method is performed when the device has data to transmit. In a first phase, in block 200, for activity detection, the device transmits at least one symbol using a long spreading signature. In a second phase, in block 202, for data transmission the device transmits a plurality of information-carrying symbols using at least one short spreading signature. The spreading signatures used for activity detection are long, and the spreading signatures used for data transmission are short, in the sense that the length of the spreading signatures for data detection is shorter than the length of the spreading signatures for activity detection.

In some embodiments, block 200 involves transmitting a single symbol multiplied by one long spreading signature. In some embodiments, the single symbol may be known to the receiver. In other embodiments, the single symbol may be data-carrying, and thus unknown to the receiver.

In some embodiments, block 200 involves transmitting a plurality of symbols using a plurality of long spreading signatures. In some embodiments, a different spreading signature is used for each of the plurality of symbols. The plurality of spreading signatures may be specified for a particular transmitter from a predefined set of spreading signatures. In some embodiments, the plurality of symbols may be known to the receiver. In other embodiments, the plurality of symbols may be data-carrying, and thus unknown to the receiver.

In some embodiments, a same long spreading signature is used for a number of symbols before a switch is made to a next long spreading signature. More specifically, a respective spreading signature of the plurality of long spreading signatures is used for each of a plurality of subsets of the plurality of symbols. For each subset, each symbol of the subset is multiplied by the respective spreading signature.

In some embodiments, the different spreading signatures are specified by assigning to the device a column-wise cyclic offset of a matrix containing the predefined set of spreading signatures.

In a specific example, an original spreading signature matrix is defined as follows:

$$S(\text{original}) = [S1, S2, \ldots, SN]$$

where each of $S1, S2, \ldots, SN$ is a column of the matrix containing a respective long spreading signature. A column-wise cyclic shift of the spreading signature matrix of M columns results in a spreading signature matrix as follows:

$$S(\text{shift } M) = S(1+M) \bmod N, S(2+M) \bmod N, \ldots, S(N+M) \bmod N$$

In a specific example, a given device is configured to use a single selected column of S for the transmission of the first subset of the plurality of symbols. Then, the device switches to S(shift M1) and uses the same column in S(shift M1) for transmission of the second subset of the plurality of symbols. Then, it switches to S(shift M1)(shift M2) and uses the same column in S(shift M1)(shift M2) for transmission of the third subset of the plurality of symbols, and so on. M1, M2, . . . can be different or the same.

In some embodiments, for a given device, the same short spreading signature is used for all of the symbols. In some embodiments, multiple spreading signatures are used. A switch in the short spreading signature can be made every symbol, or after groups of symbols. The spreading signatures may be specified for a particular transmitter from a predefined set of spreading signatures. For example, as was the case for the long spreading signatures discussed above, the different short spreading signatures may be specified by assigning to the transmitter a column-wise cyclic offset of a matrix containing the predefined set of spreading signatures, but in this case, the matrix will contain short spreading signatures instead of long spreading signatures.

In some embodiments, the two-phase transmission is performed within a context in which there is a fixed amount of resources available for a transmission for both activity detection and data transmission. For example, a fixed amount of resources may have been defined for legacy MTC transmission. In this case, the fixed amount of resources is divided into two parts, one of which is used with long spreading sequences for activity detection, and one of which is used with short spreading sequences for data transmission. In a specific example, a baseline resource assignment contains 100 resource units for single phase transmission of 10 data-carrying symbols each multiplied by a spreading signature having length 10. In a two-phase transmission, the same 100 resource units can be divided in two, with 50 units used to transmit a single known symbol multiplied by a long spreading signature having length 50, and 50 units used to transmit 10 data-carrying symbols multiplied by a short spreading signature having length 5.

Improved performance for activity detection is achievable by using a single symbol multiplied by a single spreading signature of the longest possible length given an amount of resources available for transmitting symbols for activity detection. In some embodiments, there may be a constraint on a signature length that limits the signature length to some value less than the longest possible length given the amount of resources available. Such a constraint might be imposed by a standard, for example. This is one example where transmitting a plurality of symbols for activity detection might be employed. A signature length that is the longest allowed for could be employed for symbols transmitted for activity detection. This is shorter than the longest possible signature length given the amount of resources available, but is still longer than the spreading signatures used for data transmission.

Figure 3:
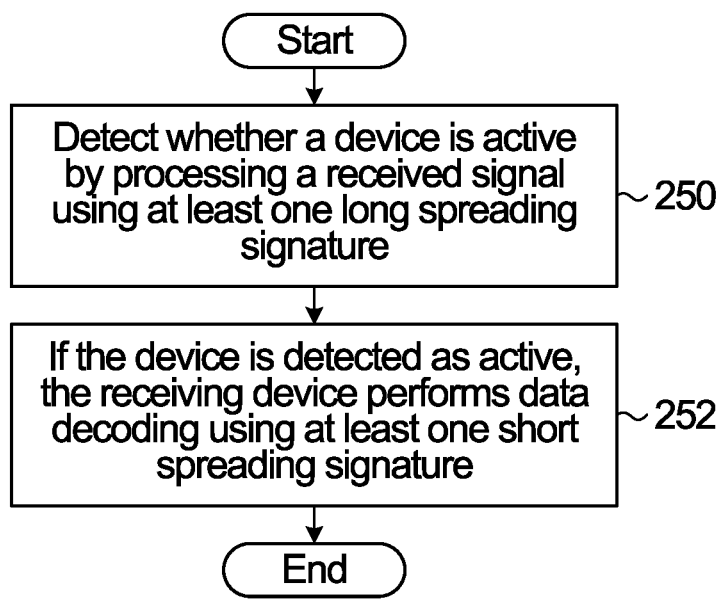
FIG. 3 is a flowchart of a method of receiving a two-phase transmission.

A method performed by a receiving device, for example the receiver 100 of FIG. 1, will now be described with reference to FIG. 3. In block 250, a receiving device detects whether a device is active by processing a received signal using at least one long spreading signature. The signatures used for activity detection are the same as those used by the potentially active device in transmitting symbols for activity detection. In block 252, if the device is detected as active, the receiving device performs data decoding using at least one short spreading signature. The signatures used for data decoding are the same as those used by the active device in transmitting symbols for data transmission.

SPECIFIC EXAMPLES

Each device has its own spreading signatures. There typically will be a number of devices that is greater, and possibly much greater, than the number of possible orthogonal spreading signatures for a given signature length, and as such non-orthogonal spreading signatures can be used. In some embodiments, the signature matrix is designed such that the active devices are ensured to have different signatures. However, this does not necessarily need to be the case. In some embodiments, signature collision is allowed up to a certain level for the data transmission phase, because UE signals with the same signature pass through different uplink channels, which enables the receiver to distinguish between them and thus do the decoding. An example of this is uplink sparse code multiple access (SCMA) with codebook collision.

Figure 4:
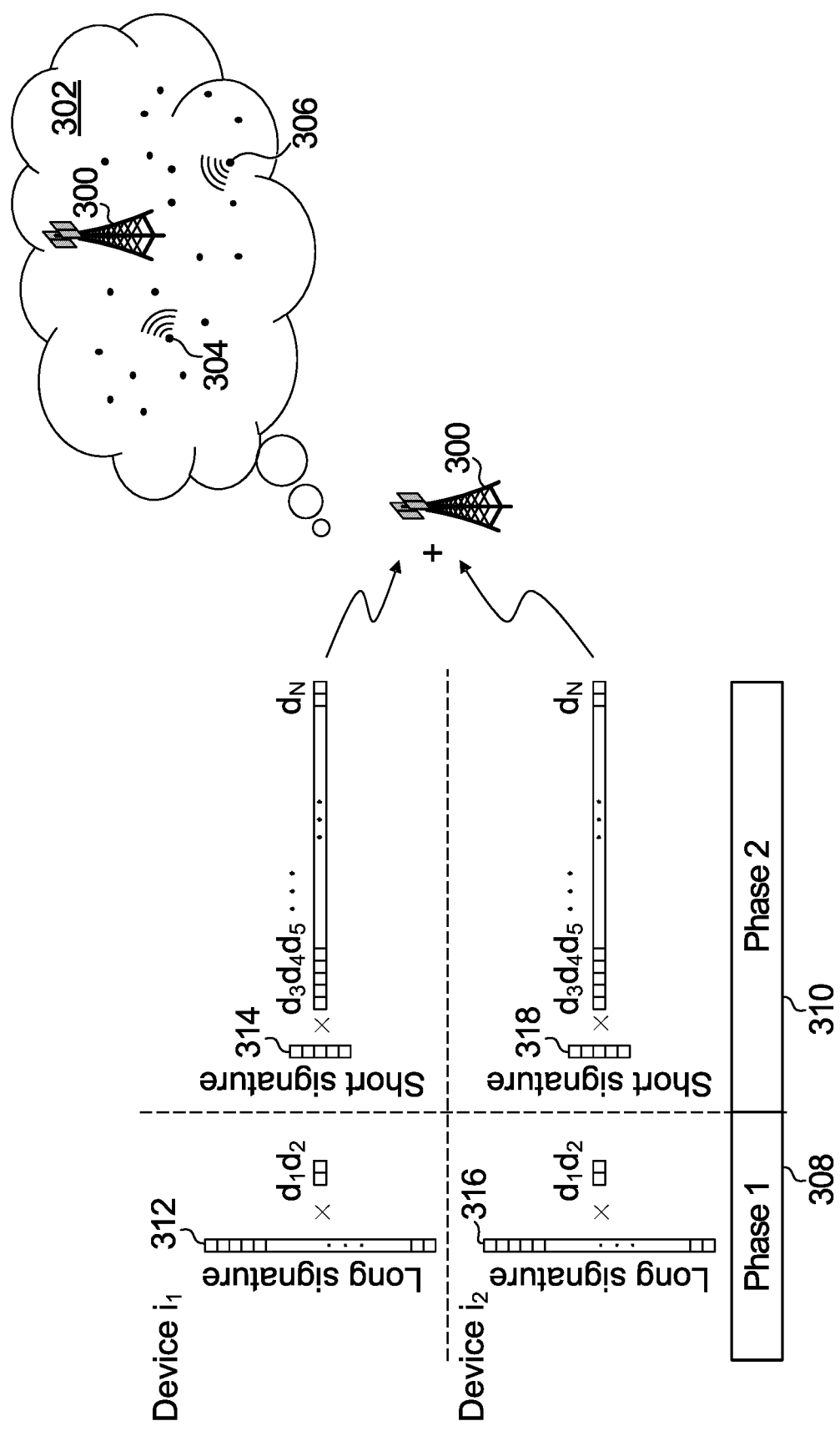
FIG. 4 depicts a specific example of a two-phase transmission.

Referring now to FIG. 4, shown is an example of two-phase device communication. Shown is a base station 300 having a coverage area 302 within which a number of devices are located. In this example, two of the devices 304,306 are active. These could be any two devices, and are referred to as device $i_1$ and $i_2$. Transmissions take place over a first phase 308 and a second phase 310. During the first phase, device $i_1$ transmits two symbols $d_1,d_2$ each multiplied by a long spreading signature 312, and during the second phase, device $i_1$ transmits data symbols d3, d4, . . . $d_N$ each multiplied by a short spreading signature 314. As discussed above, for a given device, the device may use one or multiple long spreading signatures, and may use one or multiple short spreading signatures.

Similarly, during the first phase, device $i_2$ transmits two symbols $d_1,d_2$ each multiplied by a long spreading signature 316, and during the second phase, device $i_2$ transmits data symbols $d_3, d_4, \ldots d_N$ each multiplied by a short spreading signature 318. As discussed above, for a given device, the device may use one or multiple long spreading signatures, and may use one or multiple short spreading signatures.

During the first phase, transmissions by the devices are synchronized. In some implementations, the UEs are either static or have a very low mobility, and therefore, they can be synchronized once and keep their synchronization for a long time.

The transmissions of the two devices (and more generally the transmissions of whatever devices within the coverage area of the base station are active) combine over the air and are received by the base station 300. The base station performs active device detection based on the long spreading signatures, for example using compressed sensing. The base station performs data detection using short spreading signatures, for example using an approach other than compressed sensing, for example minimum mean square error (MMSE) detection.

Figure 5:
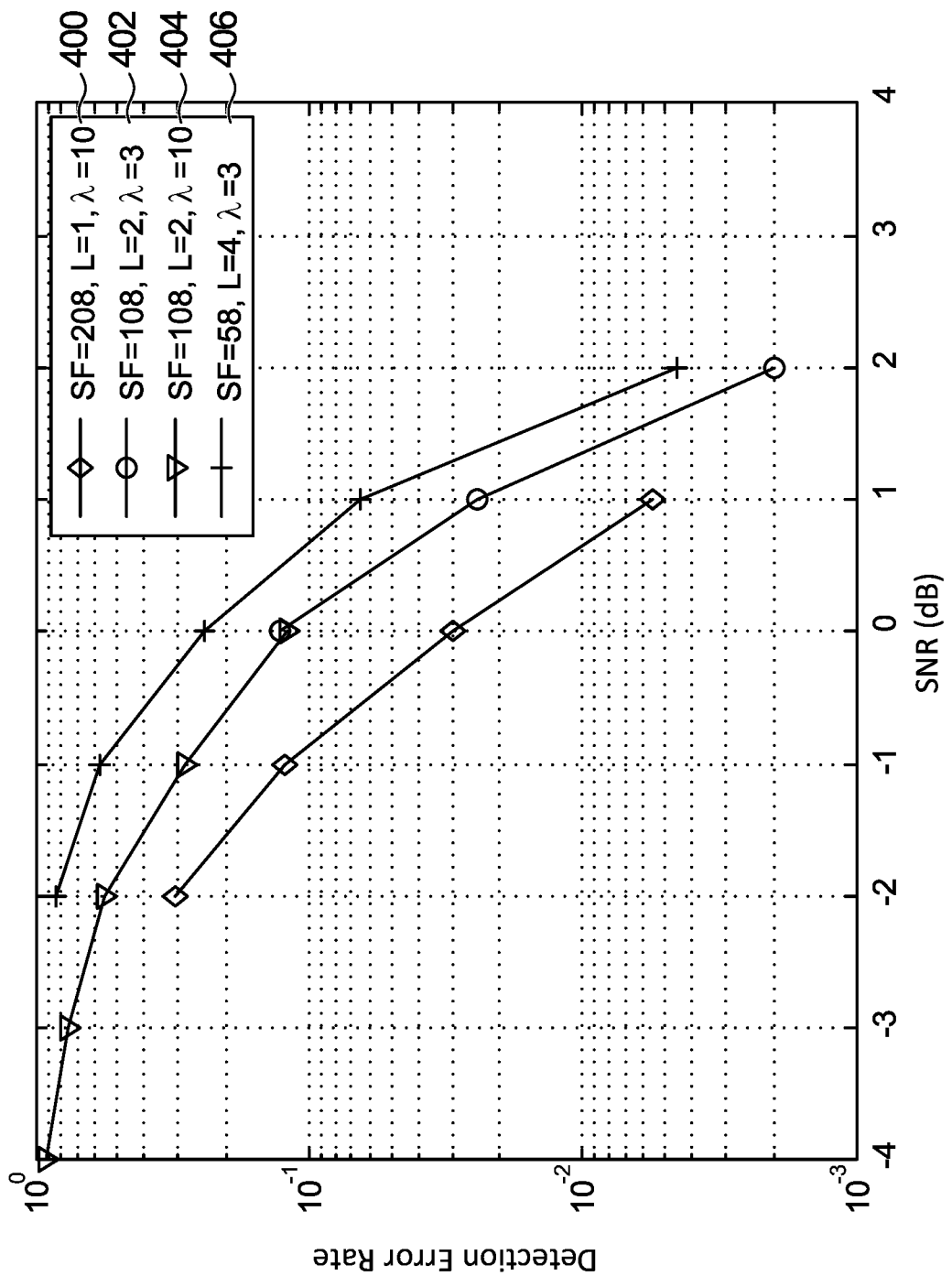
FIG. 5 provides simulation results for various two-phase transmission examples.

Example simulation results are depicted in FIG. 5. In this example, a pool size of 300 devices is employed, representing the set of devices that may be active at a given instance. The number of devices that are actually active is 6. A generalized Block Coordinate Descent (BCD) algorithm is used for compressed sensing. The modulation is quadrature phase shift keying (QPSK), and the channel is additive white Gaussian noise (AWGN). The parameters include spreading factor (SF) which represents the signature length, activity detection block length L which represents the number of symbols used for activity detection, and A which was discussed above. In FIG. 5, the following specific simulation results are shown:

a first curve 400 is shown with SF=208, L=1, and $\lambda=10$;
a second curve 402 is shown with SF=108, L=2, and $\lambda=3$;
a third curve 404 is shown with SF=108, L=2, and $\lambda=10$; and
a fourth curve 406 is shown with SF=58, L=4, and $\lambda=3$.

In some embodiments, multiple values of A are used over respective signal-to-noise ratio (SNR) ranges. When the SNR is low, the first term in the CS output is unreliable, and $\lambda$ may be set relatively high. Conversely, when SNR is high, the first term is more reliable, and $\lambda$ can be set lower.

The methods described herein are not dependent upon the particular manner in which the spreading signatures are applied to the symbols for activity detection and data transmission. In some embodiments, the spreading signatures are applied in the time domain, for example in a code division multiple access (CDMA)-like manner. In some embodiments, the spreading signatures are applied in the frequency domain, for example prior to an inverse fast Fourier transform (IFFT). In some embodiments, the spreading signatures are applied over both time and frequency.

In the example above, compressed sensing is used for activity detection. Compressed sensing is a specific example of an approach that has been used where activity is sparse. The compressed sensing approach does not rely on the fact that data transmission has a specific format, e.g. QPSK or BPSK, or the fact that it may contain a known symbol; rather the approach indicates whether an activity detection output for a given device is non-zero. Other approaches to activity detection may be used in some embodiments. For example, there may be improvements in the conventional compressed sensing approach that take advantage of other side information, such as the known symbol, and symbol format.

Figure 6:
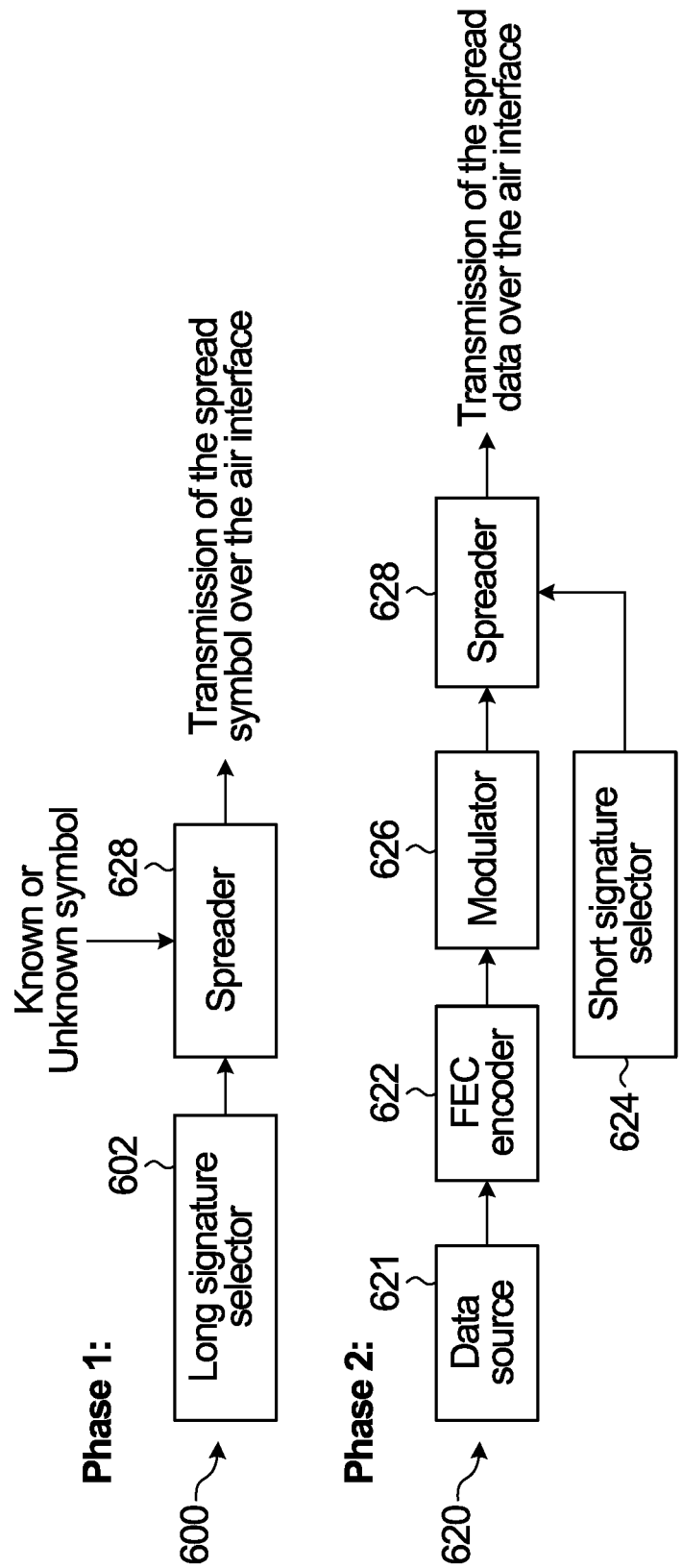
FIG. 6 is a block diagram of a transmitter for two-phase machine type communication.

FIG. 6 is a block diagram of a two-phase transmitter in baseband, for example the two-phase transmitter 103 of FIG. 1. Typically, such a transmitter would include additional functionality, such as RF receive and transmit chains, not shown. Shown is functionality, generally indicated at 600, for implementing the first phase of the two-phase transmission and functionality, generally indicated at 620 for implementing the second phase of the two-phase transmission. Note that spreader 628 is used for both phases of the transmission. There may be other components, not shown, that are used for both phases of the transmission. Functionality 600 includes a long signature selector 602 that selects and/or generates a signature for activity detection. The selected long signature is multiplied in spreader 628 by a known or unknown symbol, and the output is passed to the RF transmit chain for transmission over the air.

Also shown is functionality, generally indicated at 620, for implementing the second phase of the two-phase transmission. Shown is a data source 621, which may, for example, simply be a connection to another network. Data source 620 is connected to forward error correction (FEC) encoder 622, the output of which is connected to modulator 626. The output of modulator 626 is input to the spreader 628 which produces a signal containing spread data which is transmitted by transmit RF chain, not shown. A short signature selector 624 selects and/or generates the short signatures to be used for data transmission and passes these to the spreader 628.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

The invention claimed is:

1. A method comprising:
   detecting whether a device is active by processing a received signal using at least one spreading signature of a first length; and
   if the particular device is detected as active, performing data decoding for a transmission by the particular device using at least one spreading signature of a second length that is shorter than the first length.

2. The method of claim 1 further comprising performing the detecting and decoding steps for a plurality of devices.

3. The method of claim 2 wherein performing detecting for the plurality of devices comprises using compressed sensing.

4. The method of claim 3 wherein performing data decoding comprises using a decoding approach other than compressed sensing.

5. The method of claim 1 wherein detecting whether a device is active by processing a received signal using at least one spreading signature of a first length comprises detecting at least one known symbol using the at least one spreading signature of a first length.

6. The method of claim 1 wherein detecting whether a device is active by processing a received signal using at least one spreading signature of a first length comprises detecting at least one information carrying symbol using the at least one spreading signature of a first length.

7. The method of claim 1 wherein for activity detection, the received signal comprises a single symbol multiplied by one spreading signature of the first length.

8. The method of claim 7 wherein for data transmission, the method further comprises receiving a plurality of information-carrying symbols using a plurality of spreading signatures of the second length.

9. The method of claim 8 wherein for data transmission, receiving a plurality of information-carrying symbols using a plurality of spreading signatures of the second length comprises:
   using a respective spreading signature of the plurality of spreading signatures of the second length for each of a plurality of subsets of the plurality of information-carrying symbols;
   wherein the plurality of spreading signatures of the second length are specified for a particular transmitter from a predefined set of spreading signatures; and
   wherein the plurality of spreading signatures of the second length are specified by assigning to the transmitter a column-wise cyclic offset of a matrix containing the predefined set of spreading signatures.

10. The method of claim 1 wherein detecting whether a device is active by processing a received signal using at least one spreading signature of a first length comprises detecting a plurality of symbols using a plurality of spreading signatures of the first length.

11. The method of claim 10 wherein for activity detection, detecting a plurality of symbols using a plurality of spreading signatures of the first length comprises:
    using a respective spreading signature of the plurality of spreading signatures for each of a plurality of subsets of the plurality of symbols.

12. The method of claim 11 wherein the plurality of spreading signatures are specified for a particular transmitter from a predefined set of spreading signatures.

13. The method of claim 12 wherein the different spreading signatures are specified by a column-wise cyclic offset of a matrix containing the predefined set of spreading signatures.

14. A two-phase receiver comprising:
    an activity detector configured to detect whether a device is active by processing a received signal using at least one spreading signature of a first length; and
    a multi-user data decoder configured to perform data decoding for a transmission by the device detected to be active by the activity detector using at least one spreading signature of a second length that is shorter than the first length.

15. The receiver of claim 14 wherein the activity detector and multi-user data decoder are configured to perform the detecting and decoding for a plurality of devices.

16. The receiver of claim 15 wherein the activity detector performs detecting for the plurality of devices using compressed sensing.

17. The receiver of claim 16 wherein the multi-user data decoder performs data decoding using a decoding approach other than compressed sensing.

18. The receiver of claim 14 wherein the activity detector detects whether a device is active by detecting at least one known symbol using the at least one spreading signature of a first length.

19. The receiver of claim 14 wherein the activity detector detects whether a device is active by detecting at least one information carrying symbol using the at least one spreading signature of a first length.

20. The receiver of claim 14 wherein for activity detection, the received signal comprises a single symbol multiplied by one spreading signature of the first length.

* * * * *